Aug. 10, 1943.  G. O. BICKEL  2,326,427
ELECTRICAL GAUGE
Filed Dec. 3, 1941  2 Sheets-Sheet 1
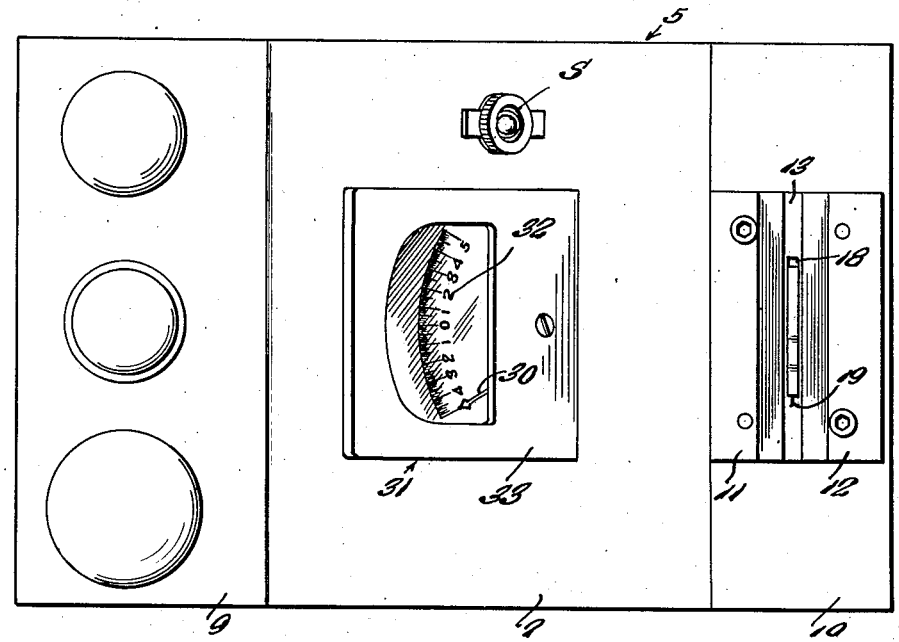
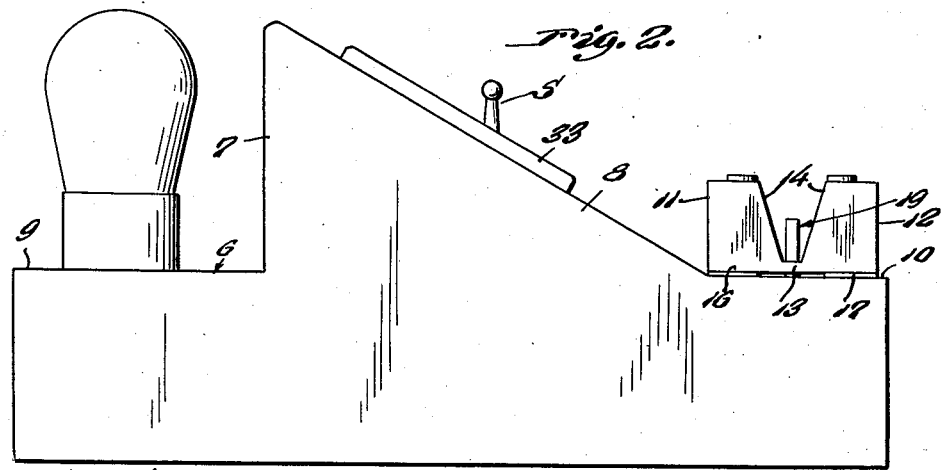
Inventor
Gerald O. Bickel
By Clarence A. O'Brien
Attorney Inventor
Gerald O. Bickel
By Clarence A. O'Brien
Attorney Patented Aug. 10, 1943

2,326,427

UNITED STATES PATENT OFFICE 2,326,427

ELECTRICAL GAUGE

Gerald O. Bickel, Kokomo, Ind.

Application December 3, 1941, Serial No. 421,510

4 Claims. (Cl. 33—178)

My invention relates to improvements in electrical gauges adapted to indicate on a meter any measurable divergence from an established normal mechanical motion or structural measurement, and particularly to an arrangement of this character wherein the displacement of a movable element causing a change in the inductance of an induction coil is utilized to operate a series tuned resonant absorption circuit connected in the plate circuit of a conventional vacuum tube oscillator to actuate a meter exhibiting such divergence, and the primary object of my invention is to provide a simple, efficient and practical arrangement of the character indicated which can be adjusted and maintained to very small limits, as high as one millionth of an inch.

Other important objects and advantages of my invention will be apparent from a reading of the following description taken in connection with the appended drawings, wherein for purposes of illustration I have shown a preferred embodiment of my invention.

In the drawings:

Figure 1 is a general top plan view of a gauge for gauging the outside diameter of a cylindrical object in accordance with the present invention.

Figure 2 is a side elevational view.

Figure 3:
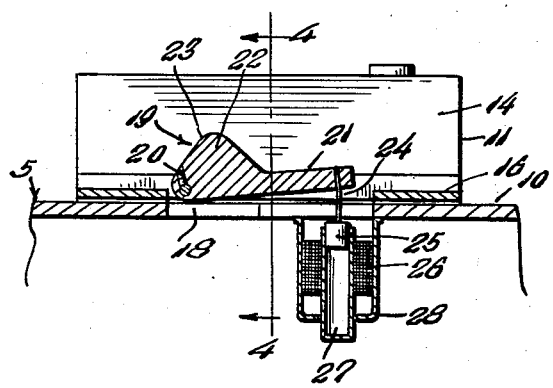
Figure 3 is a fragmentary transverse vertical sectional view taken through Figure 2.

The embodiment chosen for illustration of the invention conveniently mounts the active components on and within a cabinet 5 which is suitably of rectangular plan, with its flat top 6 upwardly extended to provide the vertical wall 7 and the declining wall 8, this projection defining the plane horizontal area 9 and the plane horizontal area 10.

Figure 4:
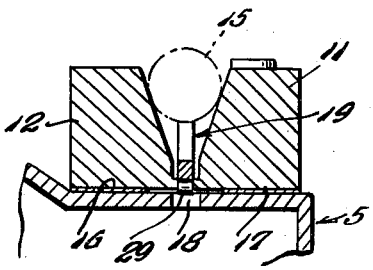
Figure 4 is a fragmentary transverse vertical sectional view taken through Figure 3 along the line 4—4 and looking toward the left in the direction of the arrows.

Mounted on the area 10 is a pair of blocks of steel or other suitable metal generally designated by the numerals 11 and 12 which may or may not be connected together as indicated by the numeral 13. The blocks have divergent inner and opposed faces 14 defining a V slot to receive the cylindrical body 15 whose outside diameter is to be gauged and checked, as indicated in Figure 4 of the drawings. The blocks 11 and 12 are secured to rest in place on replaceable shims 16 and 17, the shims being replaceable to adjust the overall height of the gauging slot between the blocks for a purpose to be indicated.

The portion 10 of the top of the casing is formed with a transversely elongated slot 18 which is registered with the space between the blocks 14 as indicated in Figure 4 of the drawings to provide working space for the anvil 19 which is pivotally supported between the blocks as indicated by the numeral 20 by one end. The anvil comprises the generally horizontal bar 21 and the substantially triangular vertical extension 22 which is located adjacent the pivot 20 and has its apex 23 rounded for conforming contact with the cylindrical object 15 when the latter is placed in the groove between the blocks for gauging purposes. The free end of the anvil 19 has depending therefrom the rod 24 which has secured to its lower end a metallic container 25 which is filled with powdered iron or filings, forming a core which is movable vertically relative to the inductance coil 26 which includes an axial tube 27 in which the core 25 works, and around which the coil is wound, and enclosing support means 28 surrounding the coil and connected to the tube 27 and to the top of the casing 5 as indicated in Figure 3 of the drawings. The pivot arrangement 20 includes a spring 29 which normally maintains the core equipped end of the anvil in an upraised position, and restores the same to this position after the object to be gauged has been removed from the groove between the gauge blocks.

In gauging the outside diameter of a cylindrical object 15, the same is placed between the gauge blocks as indicated in Figure 4 of the drawings and the same allowed to subside in engagement with the faces 14 of the gauge blocks until the sides of the cylinder 15 supportably engage the opposite faces 14 of the gauge blocks and further descent of the cylinder 15 is arrested. In this position the cylinder 15 will have depressed the core equipped end of the anvil 19 by reason of engagement with the rounded upper portion 23 of the anvil, so that the core 25 will have been displaced downwardly relative to the inductance 26, thereby causing a deflection of the hand 30 of the meter 31 relative to a scale 32 of suitably designated and graduated character. As indicated in the drawings the gauge 31 is located on the declining surface 8 with its mounting plate 33 substantially flushly supported on the surface 8.

It will be evident from the foregoing that the elevation of the cylinder 15 above the bottom of the V slot between the gauge blocks is determined by the diameter of the cylinder. The amount that the anvil 19 is depressed by the particular cylinder being gauged determines the tuning of the inductance coil 26.

Figure 5:
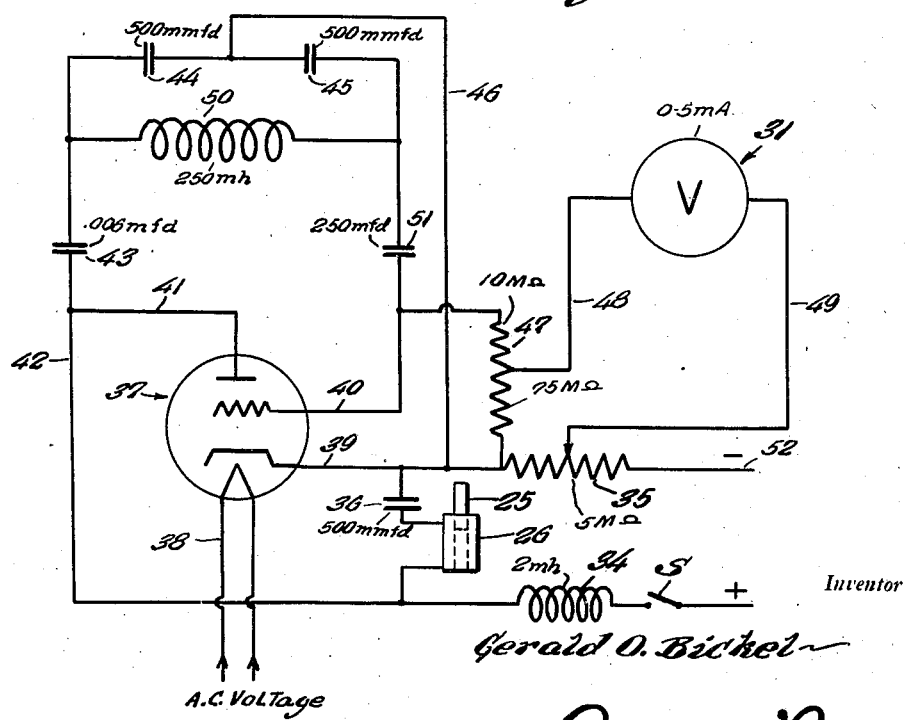
Figure 5 is a wiring diagram showing the electrical connections of the components of the embodiment.

The inductance coil 26 is arranged as the inductance in a series-tuned resonant absorption circuit connected in the plate circuit of a conventional vacuum tube oscillator, as diagrammatically indicated in Figure 5 of the drawings. The amount of power absorbed by this absorption circuit is dependent upon the series impedance of the coil 26 and condenser 36, which will be at a maximum when the coil 26 reaches a value which will make the circuit series resonant at the frequency of the oscillator. An increase in the amount of absorption is accompanied by a decrease of the oscillator grid current.

The meter 31 provides a means of measuring the oscillator grid current. A voltage opposing this current, adjusted by the resistor 35 is also applied to the meter 31. This provides a means of setting the deflection of the hand 30 of the meter 31 to some convenient scale reading, corresponding to a certain value of the inductance 26, which accompanies the placing in the V slot between the gauging blocks of a cylindrical object of known outside diameter.

The shims 16 and 17 which are placed under the gauge blocks provide means whereby the vertical distance between the gauge blocks and the value of the inductance 26 may be varied when a cylindrical object of known outside diameter is placed between the blocks for gauging.

The illustrated circuit is operated with enough iron to give an inductance of about 130 mh., or a value that will cause the circuit to approach series resonance at the frequency radiated by the vacuum tube oscillator 37. In the illustrated arrangement the inductance without the iron core has a value of about 100 mh. The inductance and capacity values given in Figure 5 of the drawings with respect to the two resonant circuits involved, radiate and resonate to about 700 k. c.

The current flow through the embodiment illustrated in Figure 5 of the drawings is as follows:

Meter 31 has a full scale range of 50 microamperes, which is 0.05 milliampere. In calibrating the meter 31, a standard cylindrical body of known diameter 15 is placed in the V-slot between the blocks 11 and 12, and shims 16 and 17 selected so that the iron core 25 will tune the inductance coil 26 over the central portion of a reasonably linear part of the curve obtained by plotting decreasing values of series impedance of condenser 36 and inductance coil 26 as the circuit of condenser 36 and inductance 26 approaches series resonance at oscillator frequency.

A portion of the grid voltage between grid 40 and cathode 39, that between point 48 and cathode 39, is applied to meter 31. Meter 31 is connected with negative polarity toward point 48. There is, however, a voltage across resistor 35 between cathode 39 and point 52, negative in the direction of point 52. A portion of this negative voltage, that between cathode 39 and point 49, is applied to meter 31, negative in the direction of point 49. This voltage is varied by moving tap 49 along resistor 35 until the difference between grid voltage across points 48 and 49, and adjusted voltage across points 49 and 39, gives rise to a desired current I through meter 31. One convenient current I is 25 microamperes, which is mid-scale on meter 31.

By then placing a cylindrical body of slightly smaller known diameter in the V-slot it will be observed that the impedance across inductance 26 and condenser 36 decreases, as the presence of this second, smaller cylindrical body results in moving the iron core 25 farther into the inductance coil, thereby increasing the inductance of coil 26, and causing this circuit to more nearly approach series resonance.

This decreases the impedance between plate 41 and cathode 39, and since the voltage feedback of the oscillator is principally determined by ratio of impedances (condensers 44 and 45) a decrease in impedance from plate to cathode will effectively reduce the impedance from 41 to 46, and consequently the impedance across condenser 44. With a smaller voltage feedback, grid voltage between grid 40 and cathode 39 decreases (becomes less negative) and although grid current decreases, since point 48 is now more negative than previously, in relation to point 49, the current through meter 31 will increase. This indicated current may be recorded for the diameter of this second standard cylindrical body of known diameter.

In a similar manner, a third cylindrical body of known diameter may be placed in position to be checked. This third body is larger than either the first or second. The result will be a larger grid voltage, but a smaller current and smaller reading on meter 31.

With several standard diameter cylindrical bodies placed in the V-slot between the blocks 12 and 11, the resulting current deflection of meter 31 may be recorded on the meter in terms of diameter change from the first body 15 which gave rise to a current I of 25 microamperes. Intervening points on meter 31 may be interpolated.

It was found, in a particular model, that the change in reading of meter 31 was about one microampere for 10 microinches changes in diameter, or a change of reading of meter 31 from zero to 50 microamperes full scale would indicate a change of 5 ten thousandths of an inch.

In use, this would mean that a standard cylindrical body, by properly arranging thickness of shims 16 and 17, would cause a deflection I—I on meter 31. Say, for example, that this deflection was 25 microamperes. If an unknown diameter is checked by placing it between the V-blocks and a meter deflection of 25 microamperes is observed, it would mean that the unknown diameter was ten microinches (ten millionths of an inch) larger than the standard which gave rise to the 25 microampere deflection.

Switch S is open except when a cylindrical body is in the V-slot to prevent excessive current through meter 31 which would result from closure of switch S when no cylindrical body was in place between the said V blocks. Restriction of height to which anvil 19 can rise will also prevent excessive current through meter 31.

The series impedance of coil 26 and condenser 36 will be at a minimum when coil 26 reaches a value of inductance which will make the said coil and condenser circuit series resonant at the frequency of the vacuum tube oscillator. This reduction in plate impedance brings about a decrease of oscillator grid current, hence it might be said that the loading effect of the coil 26 and condenser 36 will be a maximum when they are series resonant at the oscillator frequency.

Element 43 is a plate blocking condenser, which serves to isolate the D. C. plate voltage from element 50, the inductance.

Element 51 is a grid condenser. It isolates any D. C. grid voltage from the coil, element 50, but also serves, with grid resistor element 47, to give the oscillator grid self-bias.

Element 50 is the inductance which determines the frequency of the oscillator, associated with elements 44 and 45 to form a parallel resonant circuit.

In general, elements 43, 44, 45, 50 and 51 are components of one conventional form of Colpitts oscillator.

By way of further explanation of the mode of operation of the induction coil, this induction coil and an associated condenser constitute a series resonant circuit, and the series resonant circuit is in parallel with the A. C. plate to cathode impedance of the oscillator. It causes a shunting effect on the oscillator plate to cathode impedance even when the circuit is tuned away from series resonance, but the change in impedance caused by the tuning of the induction coil is the effect which is used to change the oscillator grid voltage as previously described herein.

Although I have shown and described herein a preferred embodiment of my invention, it is to be definitely understood that I do not wish to limit the application of my invention thereto, except as may be required by the scope of the subjoined claims.

Having described the invention, what is claimed as new is:

1. A device of the character described comprising an inductance, means related to said inductance to vary the inductance thereof, anvil means for displacing a portion of said means from an initial rest position to a final rest position, a series tuned resonant absorption circuit in which said inductance is incorporated, a vacuum tube oscillator circuit having said absorption circuit connected in its plate circuit, and indicating means for visibly indicating the decrease in oscillator grid current resulting from the decrease in plate impedance accompanying the approach of the said absorption circuit to a condition of series resonance.

2. A device of the character described comprising an inductance, means related to said inductance to vary the inductance thereof, anvil means for displacing a portion of said means from an initial rest position to a final rest position, a series tuned resonant absorption circuit in which said inductance is incorporated, a vacuum tube oscillator circuit having said absorption circuit connected in its plate circuit, and indicating means for visibly indicating the decrease in oscillator grid current resulting from the decrease in plate impedance accompanying the approach of the said absorption circuit to a condition of series resonance, said indicating means comprising a deflection meter.

3. A device of the character described comprising an inductance coil, a core related to said coil to vary the inductance thereof, anvil means for displacing said core from an initial rest position to a final rest position, a series tuned resonant absorption circuit in which said coil is incorporated, and indicating means actuated by said circuit for visibly indicating approach of said absorption circuit to a condition of series resonance, said anvil means comprising a support, a pair of blocks on said support having divergent opposed faces forming a V-slot between the blocks converging to a smaller spacing than the diameter of a cylindrical object to be gauged, said anvil means further comprising a spring-pressed anvil located between and mounted on the blocks to be displaced by the cylindrical object until said object supportably rests on the opposed divergent faces of the blocks, said core being mechanically connected to said anvil, and means for adjusting the anvil blocks toward and away from said support.

4. A device of the character described comprising an inductance coil, a core related to said coil to vary the inductance thereof, relative to which core is movable to tune said coil, anvil means for displacing said core from an initial rest position to a final rest position, a series tuned resonant absorption circuit in which said inductance coil is incorporated, a vacuum tube oscillator circuit having said absorption circuit connected in its plate circuit, and indicating means for visibly indicating the decrease in oscillator grid current resulting from the decrease in plate impedance accompanying the approach of the said absorption circuit to a condition of series resonance, said circuit containing an adjustable resistor for predetermining the voltage applied in opposition to the oscillator grid current, to adjust the indicating means to zero or other selected reference points.

GERALD O. BICKEL.